US006992962B1

(12) United States Patent
Mashimo et al.

(10) Patent No.: US 6,992,962 B1
(45) Date of Patent: Jan. 31, 2006

(54) WOBBLE SIGNAL DETECTION CIRCUIT HAVING A LOWPASS FILTER FOR DETECTING A WOBBLE SIGNAL WITH REDUCED SAMPLING NOISE

(75) Inventors: Akira Mashimo, Tokorozawa (JP); Keishi Ueno, Hanno (JP)

(73) Assignee: Teac Corporation, (JP)

( * ) Notice: Subject to any disclaimer, the term of this patent is extended or adjusted under 35 U.S.C. 154(b) by 769 days.

(21) Appl. No.: 09/663,956

(22) Filed: Sep. 19, 2000

(30) Foreign Application Priority Data

Sep. 20, 1999 (JP) ................................. 11-266090

(51) Int. Cl.
G11B 20/18 (2006.01)
(52) U.S. Cl. .................................. 369/53.31; 369/59.19
(58) Field of Classification Search ............. 369/47.55, 369/53.31, 53.37, 59.16, 59.19
See application file for complete search history.

(56) References Cited

U.S. PATENT DOCUMENTS

| 5,339,302 | A |   | 8/1994  | Takahashi et al. |          |
|-----------|---|---|---------|------------------|----------|
| 5,459,706 | A | * | 10/1995 | Ogawa et al.     | 369/53.31|
| 5,511,061 | A | * | 4/1996  | Ando et al.      | 369/47.45|
| 5,831,951 | A | * | 11/1998 | Kamioka et al.   | 369/47.26|
| 5,936,921 | A | * | 8/1999  | Iimura           | 369/47.25|
| 6,175,542 | B1| * | 1/2001  | Okada et al.     | 369/59.17|
| 6,324,135 | B1| * | 11/2001 | Kim et al.       | 369/47.17|
| 6,418,105 | B1| * | 7/2002  | Horino et al.    | 369/53.37|
| 6,556,523 | B1| * | 4/2003  | Masui            | 369/47.28|
| 6,560,172 | B1| * | 5/2003  | Nakajo           | 369/44.13|

FOREIGN PATENT DOCUMENTS

| JP | 57-15516  | * | 1/1982 |
| JP | 6-187649  | * | 7/1984 |
| JP | 9-270137  | * | 10/1997|
| JP | 09-326122 | * | 12/1997|

OTHER PUBLICATIONS

MAT (machine assisted translation of) JP 09-326122.*
Abstract of JP 57-15516.*
Office Action of Japanese Patent Office in Japanese for Japanese Patent Application No. 11-266090, with English translation, citing three Japanese Laid-Open Patent Publications as references.
Japanese Laid-Open Patent Publication No. 2000-200419 with English Abstract.
Japanese Laid-Open Patent Publication No. 11-161982 with English Abstract.
Japanese Laid-Open Patent Publication No. 09-326122 with English Abstract.

* cited by examiner

*Primary Examiner*—A M Psitos
(74) *Attorney, Agent, or Firm*—Anderson Kill & Olick, PC

(57) ABSTRACT

A wobble signal detection circuit is provided for an optical disk apparatus which detects a wobble signal by focusing a light beam into a spot on a pregroove on an optical disk during recording of data onto and reproduction of data from the optical disk, and includes a photodetector which detects first and second lights from first and second portions of the spot, respectively, and outputs first and second detection signals corresponding to respective power levels of the first and second detection lights. The wobble signal detection circuit includes: a sample-and-hold circuit sampling and holding the first and second detection signals output from said photodetector during the recording of the data onto the optical disk; lowpass filter means for reducing noise components of the respective first and second detection signals; and subtraction means for calculating a difference between the first and second detection signals respectively output from said lowpass filter means so as to obtain the wobble signal.

4 Claims, 6 Drawing Sheets

FIG. 3A  DETECTOR OUTPUT A
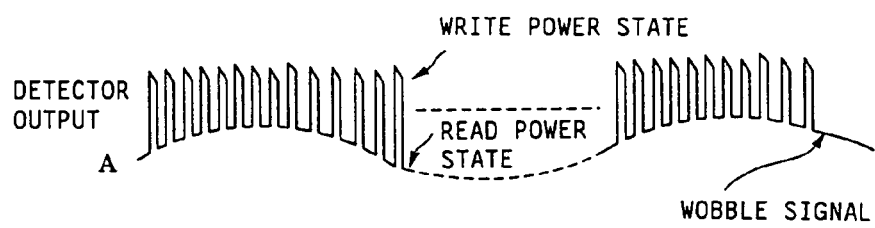
FIG. 3B  DETECTOR OUTPUT A
FIG. 3C  SAMPLING PULSE SIGNAL
FIG. 3D  OUTPUT SIGNAL (A+B) FROM ADDER 16
FIG. 3E  OUTPUT SIGNAL (C+D) FROM ADDER 18
FIG. 3F  OUTPUT SIGNAL (A+B)−(C+D) FROM SUBTRACTER 20
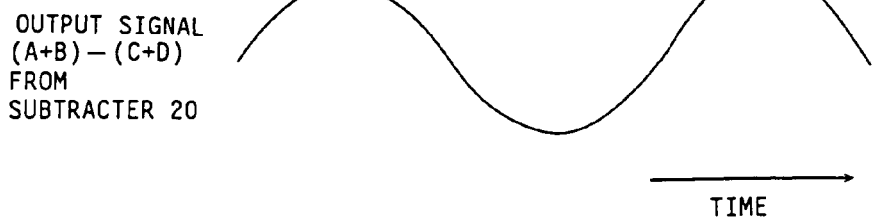
TIME

WOBBLE SIGNAL DETECTION CIRCUIT HAVING A LOWPASS FILTER FOR DETECTING A WOBBLE SIGNAL WITH REDUCED SAMPLING NOISE

BACKGROUND OF THE INVENTION

1. Field of the Invention

The present invention generally relates to wobble signal detection circuits and optical disk apparatus having such, and more particularly, to a wobble signal detection circuit for detecting an Absolute Time In Pregroove (ATIP) signal from an optical disk such as a compact disk recordable (CD-R) in an optical disk apparatus, and an optical disk apparatus having such.

2. Description of the Related Art

Optical disks of a direct-read-after-write type include two types: write-once and erasable. With respect to a write-once optical disk, data is written thereon mainly by focusing a light beam into a spot on a data recording surface of the disk made from tellurium (Te) or bismuth (Bi) so as to form a pit in the disk at the location of the spot, or by focusing a light beam into a spot on a data recording surface of the disk made from $Sb_2Se_3$, $TeO_x$ or a thin film of organic dye so as to alter reflectivity of the disk at the location of the spot.

A CD-R, which is a write-once optical disk, includes a number of pregrooves as guiding tracks. The pregrooves radially wobble slightly at a center frequency of 22.05 kHz. Address information during recording called ATIP is multiplexed and recorded in the pregrooves by frequency shift keying (FSK) with a maximum deviation of ±1 kHz.

During recording of data onto and reproduction of data from the CD-R, a wobble signal having the above-mentioned center frequency of 22.05 kHz is reproduced from the pregrooves to detect the ATIP information, which is employed to confirm a recording position on the data recording surface of the CD-R during recording.

In other words, the ATIP information is detected in the following three modes: a first mode wherein a wobble signal is reproduced from an unrecorded CD-R, a second mode wherein a wobble signal is reproduced from a CD-R during the recording, and a third mode wherein a wobble signal is reproduced from a recorded CD-R.

FIG. 2 shows a pregroove 10 of a CD-R and a 4-part detector 12 (a photodetector) for detecting a light beam reflected back from the pregroove 10. The 4-part detector 12 is made of four detector parts 12A, 12B, 12C and 12D. In FIG. 2, the detector parts 12A and 12B form the left half and the detector parts 12C and 12D form the right half of the 4-part detector 12 with respect to a scanning direction indicated by an arrow. Conventionally, in the above-mentioned second mode, when the light beam is focused into a spot on the pregroove 10, the detector parts 12A, 12B, 12C, and 12D detect the reflected beam, and output detection signals A, B, C and D, respectively.

The detection signals are sampled and held. Then, the detection signals A and B detected by the respective detector parts 12A and 12B are added, and the detection signals C and D detected by the respective detector parts 12C and 12D are added.

The signal (C+D) is subtracted from the signal (A+B) so that an output signal (A+B)−(C+D) is obtained. Then, the output signal (A+B)−(C+D) is compared with a reference voltage, so that a binary wobble signal is obtained.

FIG. 3A shows a waveform of the output level of the detection signal A. As shown in FIG. 3A, the power of the light beam alternately repeats a write power state (the maximum value) and a read power state (the minimum value). A portion of the waveform of FIG. 3A including lower peaks is shown on an enlarged scale along the time-base direction in FIG. 3B. When the light beam is in the read power state, the detection signal A shown in FIG. 3B is sampled and held at sampling timings corresponding to rising edges of a sampling pulse signal shown in FIG. 3C. The sampled and held signal includes a noise generated by the above-described sampling (a sampling noise), so that the signals (A+B) and (C+D) have waveforms shown in FIGS. 3D and 3E, respectively. The sampling noise includes a noise generated by the swing of a read light caused by the transition of the beam power state from the write power state to the read power state. Moreover, in the case of overwriting an erasable optical disk such as a compact disk rewritable (CD-RW), the sampling noise further includes a signal component previously recorded on the disk, which appears as a noise in the sampling. The subtraction of the signal (C+D) from the signal (A+B) is performed to offset the sampling noises so that the output signal (A+B)−(C+D) has a desirable waveform with reduced sampling noise as shown in FIG. 3F. Thereafter, the output signal (A+B)−(C+D) is compared with a reference voltage, so that the binary wobble signal is obtained.

However, the gain and offset of a sample-and-hold circuit are inconsistent among the individual circuits, and cause errors in the output level of the sample-and-hold circuit. Therefore, the waveforms of the sampled and held detection signals A, B, C and D include the sampling noises having different levels. For example, when the sampling noise of the signal (A+B) shown in FIG. 1A has a noise level higher than that of the sampling noise of the signal (C+D) shown in FIG. 1B, the sampling noises are not completely offset by the subtraction. Therefore, the sampling noise remains in the output signal (A+B)−(C+D) as shown in FIG. 1C. As the sampling is performed at higher speed, the noise level of the sampling noise becomes higher. Therefore, when a recording speed becomes so high that the sampling noise cannot be ignored, there arises a problem of deterioration in performance of reproducing the ATIP information from the wobble signal.

SUMMARY OF THE INVENTION

It is a general object of the present invention to provide a wobble signal detection circuit and an optical disk apparatus having such in which the above-described disadvantage is eliminated.

A more specific object of the present invention is to provide a wobble signal detection circuit which can effectively reduce a sampling noise of a wobble signal when the wobble signal is reproduced during recording so as to improve its capacity to reproduce ATIP information, and an optical disk apparatus having such.

The above objects of the present invention are achieved by a wobble signal detection circuit for an optical disk apparatus detecting a wobble signal by focusing a light beam into a spot on a pregroove on an optical disk during recording of data onto and reproduction of data from the optical disk and including a photodetector which detects first and second lights from first and second portions of the spot, respectively, and outputs first and second detection signals corresponding to respective power levels of the first and second lights, the first and second portions being formed by splitting the spot into two portions in parallel with a scanning direction, the wobble signal detection circuit including: a sample-and-hold circuit sampling and holding the first and second detection signals output from the photodetector during the recording of the data onto the optical disk; lowpass filter means for reducing noise components of the respective first and second detection signals, the noise components being generated by sampling the respective first and second detection signals in the sample-and-hold circuit; and subtraction means for calculating a difference between the first and second detection signals respectively output from the first and second lowpass filter means so as to obtain the wobble signal.

According to the above wobble signal detection circuit, the wobble signal is obtained by reducing the sampling noise components of the detected signals output from the sample-and-hold circuit. Therefore, a sampling noise component of the wobble signal can be reduced effectively, thus achieving the improved capacity to reproduce ATIP information.

The above objects of the present invention are also achieved by a wobble signal detection circuit for an optical disk apparatus detecting a wobble signal by focusing a light beam into a spot on a pregroove on an optical disk during recording of data onto and reproduction of data from the optical disk and including a photodetector which detects first and second lights from first and second portions of the spot, respectively, and outputs first and second detection signals corresponding to respective power levels of the first and second lights, the first and second portions being formed by splitting the spot into two portions in parallel with a scanning direction the wobble signal detection circuit including: a sample-and-hold circuit sampling and holding the first and second detection signals output from the photodetector during the recording of the data onto the optical disk; gain adjustment means for adjusting noise levels of noise components included in the respective first and second detection signals to approximately the same level, the noise components being generated by sampling the respective first and second detection signals in the sample-and-hold circuit; and subtraction means for calculating a difference between the first and second detection signals respectively output from the gain adjustment means.

The above objects of the present invention are also achieved by an optical disk apparatus for recording data onto and reproducing data from an optical disk by detecting a wobble signal by focusing a light beam as a spot onto a pregroove on the optical disk, the optical disk apparatus including: a photodetector which detects first and second lights from first and second portions of the spot, respectively, and outputs first and second detection signals corresponding to respective power levels of the first and second lights, the first and second portions being formed by splitting the spot into two portions in parallel with a scanning direction; and a wobble signal detection circuit, the wobble signal detection circuit including: a sample-and-hold circuit sampling and holding the first and second detection signals output from the photodetector during the recording of the data onto the optical disk; lowpass filter means for reducing noise components of the first and second detection signals, the noise components being generated by sampling the respective first and second detection signals in the sample-and-hold circuit; and subtraction means for calculating a difference between the first and second detection signals respectively output from the lowpass filter means so as to obtain the wobble signal.

The above objects of the present invention are further achieved by an optical disk apparatus for recording data onto and reproducing data from an optical disk by detecting a wobble signal by focusing a light beam into a spot on a pregroove on the optical disk, the optical disk apparatus including: a photodetector which detects first and second lights from first and second portions of the spot, respectively, and outputs first and second detection signals corresponding to respective power levels of the first and second lights, the first and second portions being formed by splitting the spot into two portions in parallel with a scanning direction; and a wobble signal detection circuit, the wobble signal detection circuit including: a sample-and-hold circuit sampling and holding the first and second detection signals output from the photodetector during the recording of the data onto the optical disk; gain adjustment means for adjusting noise levels of noise components included in the respective first and second detection signals to approximately the same level, the noise components being generated by sampling the respective first and second detection signals in the sample-and-hold circuit; and subtraction means for calculating a difference between the first and second detection signals respectively output from the gain adjustment means.

BRIEF DESCRIPTION OF THE DRAWINGS

Other objects, features and advantages of the present invention will become more apparent from the following detailed description when read in conjunction with the accompanying drawings, in which:

FIGS. 3A through 3F are diagrams showing waveforms of signals for illustrating the way the sampling noise is reduced in the conventional wobble signal detection circuit and in embodiments of the present invention;

DETAILED DESCRIPTION OF THE PREFERRED EMBODIMENTS

A description will be given, with reference to the accompanying drawings, of embodiments of the present invention.

Figure 4:
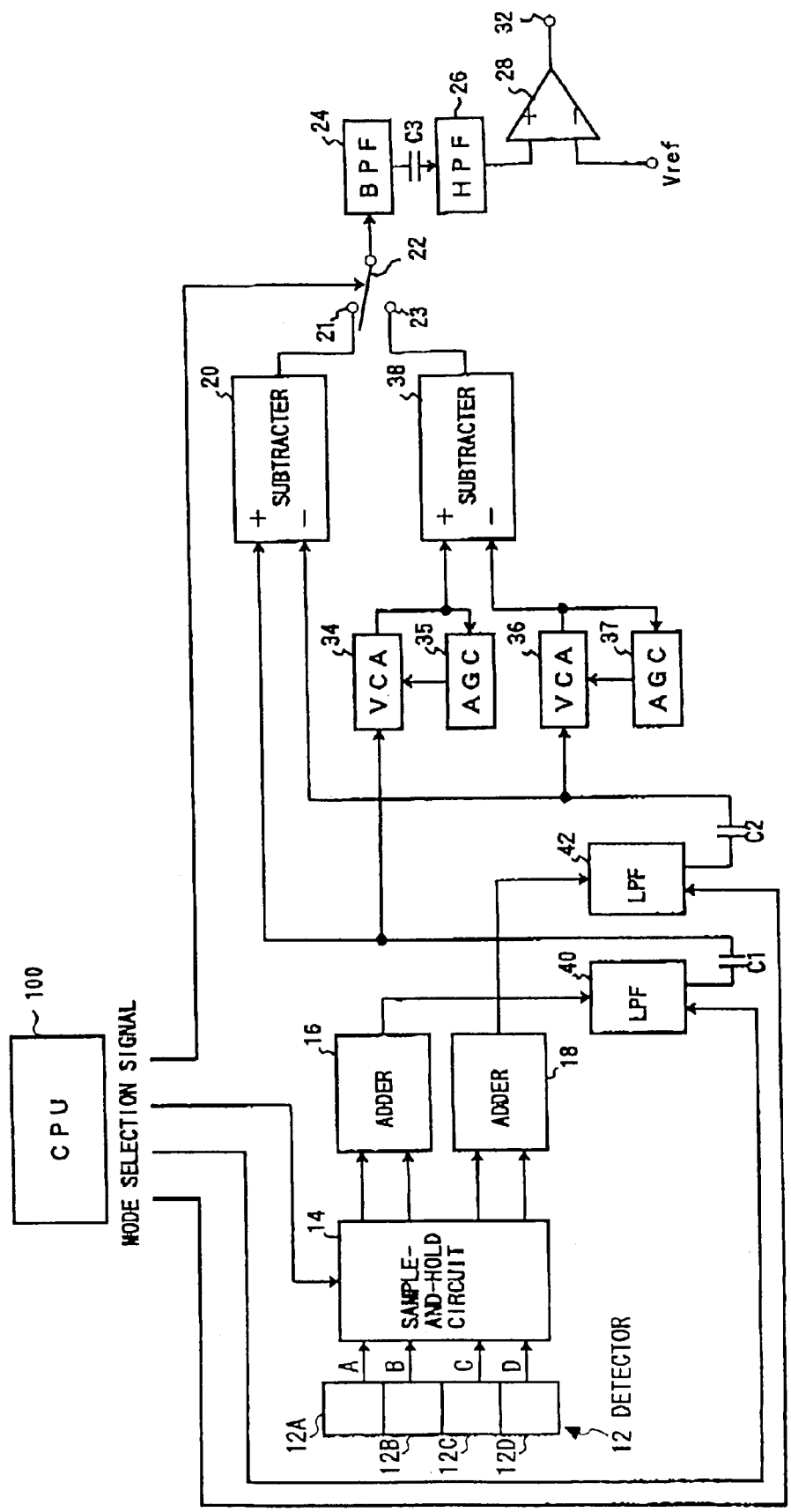
FIG. 4 is a block diagram of a wobble signal detection circuit according to a first embodiment of the present invention.

FIG. 4 is a block diagram of a wobble signal detection circuit according to a first embodiment of the present invention.

Figure 1:
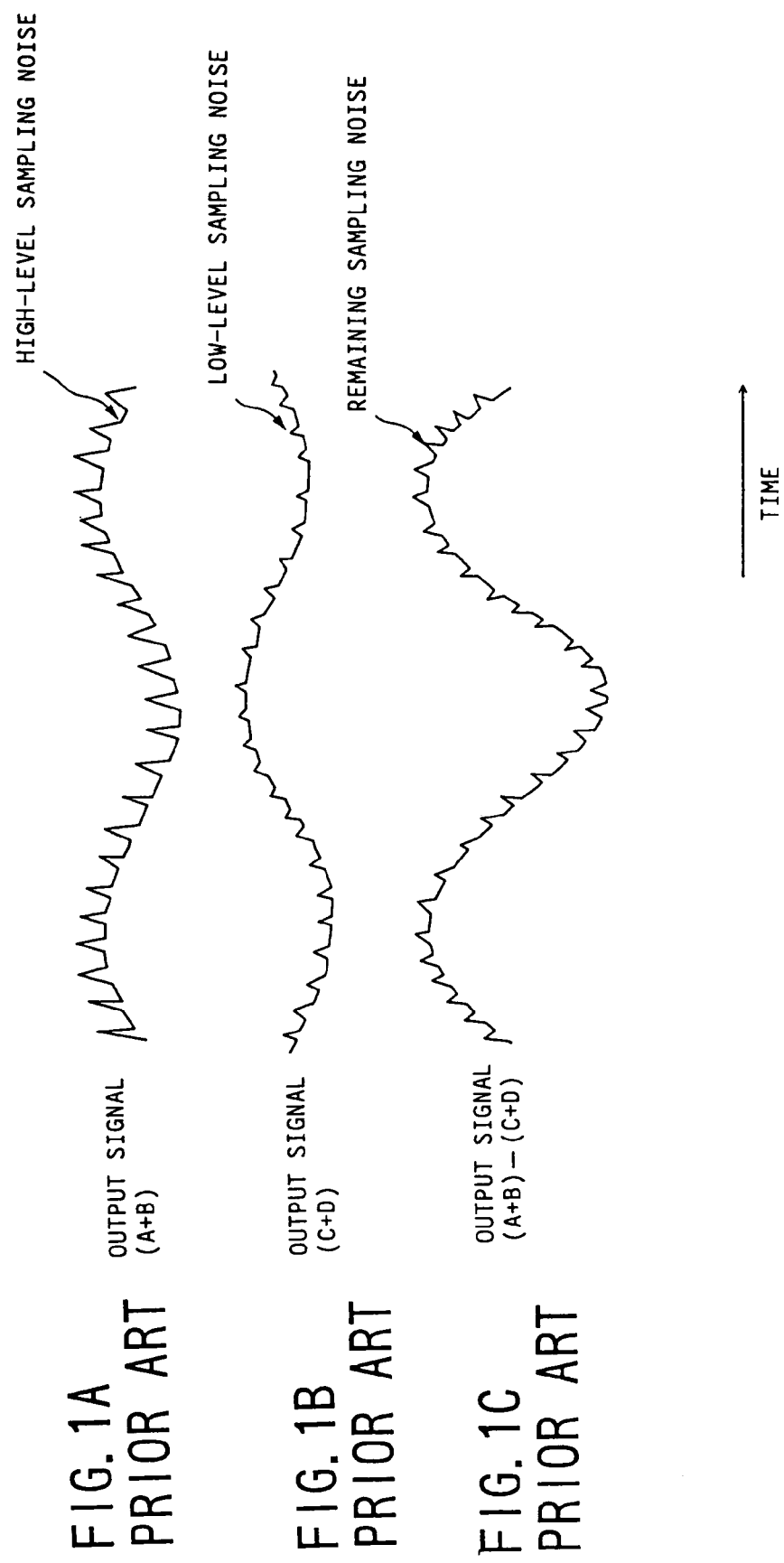
FIGS. 1A through 1C are diagrams showing waveforms of signals for illustrating the way a sampling noise is reduced in a conventional wobble signal detection circuit.
Figure 2:
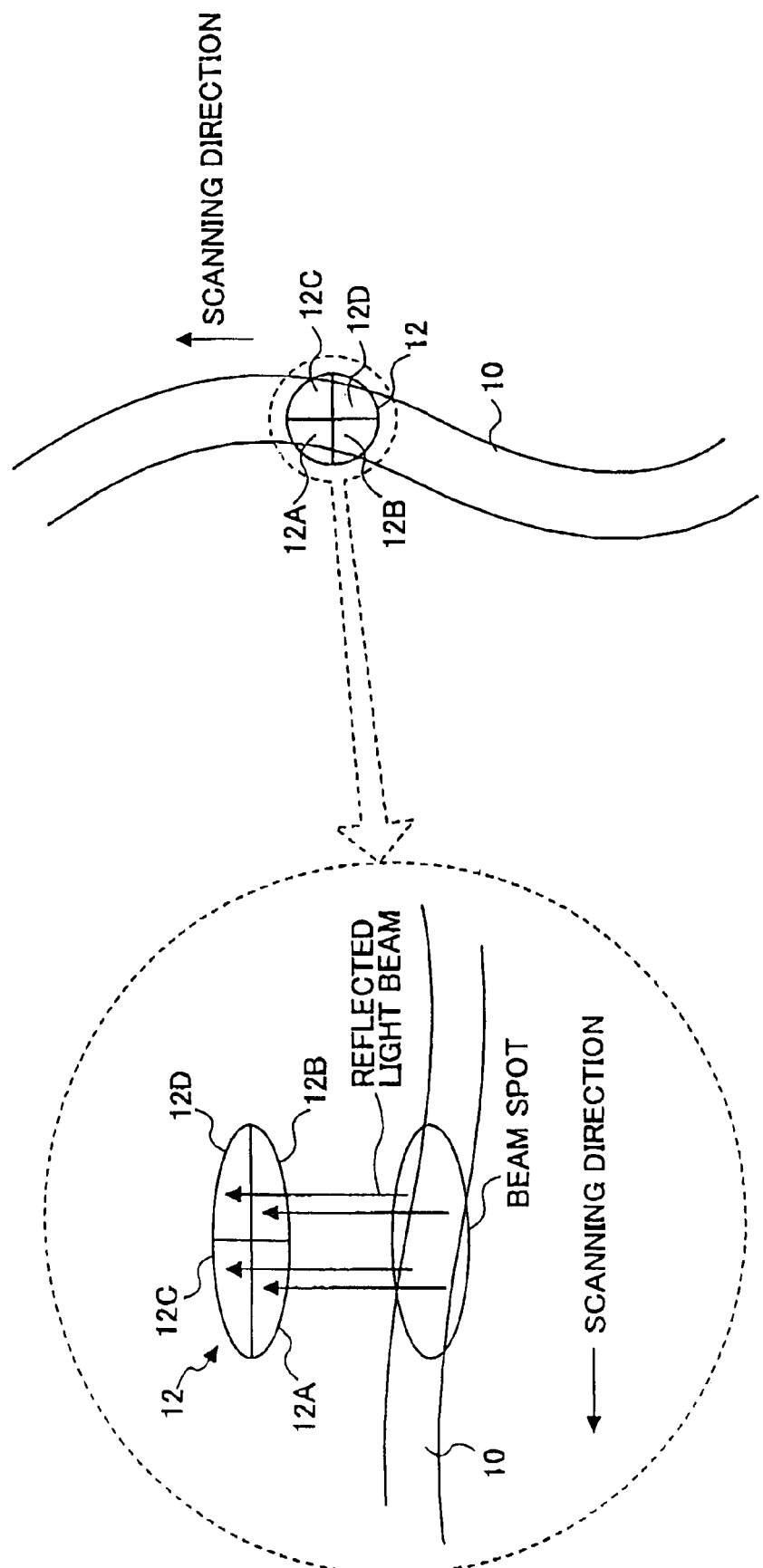
FIG. 2 is a diagram showing a pregroove of a CD-R and a 4-part detector.

When the light beam is focused into a spot on the pregroove 10 shown in FIG. 2, the detector parts 12A, 12B, 12C and 12D detect the reflected beam, and supply the detection signals A, B, C and D, respectively, to a sample-and-hold circuit 14.

The sample-and-hold circuit 14 which is also supplied with a mode selection signal from a CPU 100 is switched OFF in the above-described first and third modes to pass the supplied detection signals as outputs, while switched ON in the above-described second mode to sample, hold and output the supplied detection signals. The detection signals A and B detected by the respective detector parts 12A and 12B are output from the sample-and-hold circuit 14 to be added by an adder 16, and the detection signals C and D detected by the respective detector parts 12C and 12D are output from the sample-and-hold circuit 14 to be added by an adder 18.

Output signals (A+B) and (C+D) of the adders 16 and 18 are supplied to lowpass filters (LPF) 40 and 42, respectively. The LPFs 40 and 42 each of which is also supplied with the mode selection signal from the CPU 100 are switched OFF in the first and third modes to pass the supplied signals as outputs, and are switched ON in the second mode to cut off high-frequency components of the supplied detection signals having frequencies higher than the wobble signal frequency of 22.05±1 kHz by using, for example, a cutoff frequency of 24 kHz. The sampling noise is a high-frequency component having a frequency of 200 kHz or higher.

In the first mode, the output signals (A+B) and (C+D) of the adders 16 and 18, after passing through the LPFs 40 and 42, are supplied to a subtracter 20 via coupling capacitors C1 and C2, respectively. The subtracter 20 subtracts the output signal (C+D) from the output signal (A+B), and supplies a difference between the two output signals to a terminal 21 of a switch 22 as an output signal (A+B)–(C+D) because the terminal 21 of the switch 22 which is supplied with the mode selection signal from the CPU 100 is selected in the first mode. The output signal (A+B)–(C+D) of the subtracter 20 is supplied to a bandpass filter (BPF) 24, where unnecessary frequency components of the output signal (A+B)–(C+D) are reduced. The output signal (A+B)–(C+D) is further supplied to a highpass filter (HPF) 26 via a coupling capacitor C3, where unnecessary frequency components of the output signal (A+B)–(C+D) are reduced. Then, the output signal (A+B)–(C+D) is compared with a reference voltage $V_{ref}$ by a comparator 28 and is output from a terminal 32 as a binary wobble signal.

On the other hand, in the third mode, the LPFs 40 and 42 are switched OFF, and a terminal 23 of the switch 22 is selected. An output signal (A+B+RF) of the adder 16 including an RF signal reproduced from the CD-R is supplied to a voltage-controlled amplifier (VCA) 34, while an output signal (C+D+RF) of the adder 18 including the reproduced RF signal is supplied to a VCA 36. An automatic gain control (AGC) circuit 35 performs feedback control so that an amplitude of the output signal (A+B+RF) of the VCA 34 has a predetermined level. Similarly, an AGC circuit 37 performs feedback control so that an amplitude of the output signal (C+D+RF) of the VCA 36 has the predetermined level.

A subtracter 38 subtracts the output signal (C+D+RF) of the VCA 36 from the output signal (A+B+RF) of the VCA 34. By this subtraction, the reproduced RF signals included in the respective signals A, B, C, and D are offset, and the difference between the two output signals (A+B+RF) and (C+D+RF) is supplied to the terminal 23 of the switch 22 as an output signal (A+B)–(C+D).

As the terminal 23 is selected in the third mode, the output signal (A+B)–(C+D) is supplied to the BPF 24 for the reduction of unnecessary frequency components, and is further supplied to the HPF 26 via the coupling capacitor C3 for further reduction of unnecessary frequency components. Thereafter, the output signal (A+B)–(C+D) is compared with the reference voltage $V_{ref}$ by the comparator 28 and is output from the terminal 32 as the binary wobble signal.

Further, in the second mode, the sample-and-hold circuit 14 and the LPFs 40 and 42 are switched ON, and the terminal 21 of the switch 22 is selected. As shown in FIG. 3A, the power of the light beam alternately repeats the write power state (the maximum value) and the read power state (the minimum value). When the light beam is in the read power state, the sample-and-hold circuit 14 samples and holds the detection signals at the sampling timings corresponding to the rising edges of the sampling pulse signal as previously described with reference to FIGS. 3B and 3C.

The output signals from the sample-and-hold circuit 14 each include the sampling noise, so that the output signals (A+B) and (C+D) of the adders 16 and 18 have the waveforms shown in FIGS. 3D and 3E, respectively. However, as the sampling noises of the output signals (A+B) and (C+D) are reduced by the LPFs 40 and 42, the subtracter 20 calculates the difference between the output signals (A+B) and (C+D), and outputs the signal (A+B)–(C+D) having the waveform with reduced sampling noise as shown in FIG. 3F.

As the terminal 21 is selected, the output signal (A+B)–(C+D) is supplied to the BPF 24 for the reduction of unnecessary frequency components, and is further supplied to the HPF 26 via the coupling capacitor C3 for further reduction of unnecessary frequency components. Thereafter, the output signal (A+B)–(C+D) is compared with the reference voltage $V_{ref}$ by the comparator 28 and is output from the terminal 32 as the binary wobble signal.

As described above, the sampling noise included in the wobble signal can be reduced effectively, and the capacity to reproduce the ATIP information during recording, particularly, during high-speed recording, can be improved.

According to this embodiment, the subtracter 20 is connected between the BPF 24 and each of the LPFs 40 and 42. This is because, if the subtracter 20 were connected between the adders 16 and 18 and the LPFs 40 and 42, the subtraction by the subtracter 20 may shift the frequencies of the sampling noises to a lower frequency band, and the sampling noises may pass through the LPFs 40 and 42. A LPF similar to the LPFs 40 and 42 can be connected, for each of the output signals of the sample-and-hold circuit 14, between the sample-and-hold circuit 14 and each of the adders 16 and 18.

Figure 5:
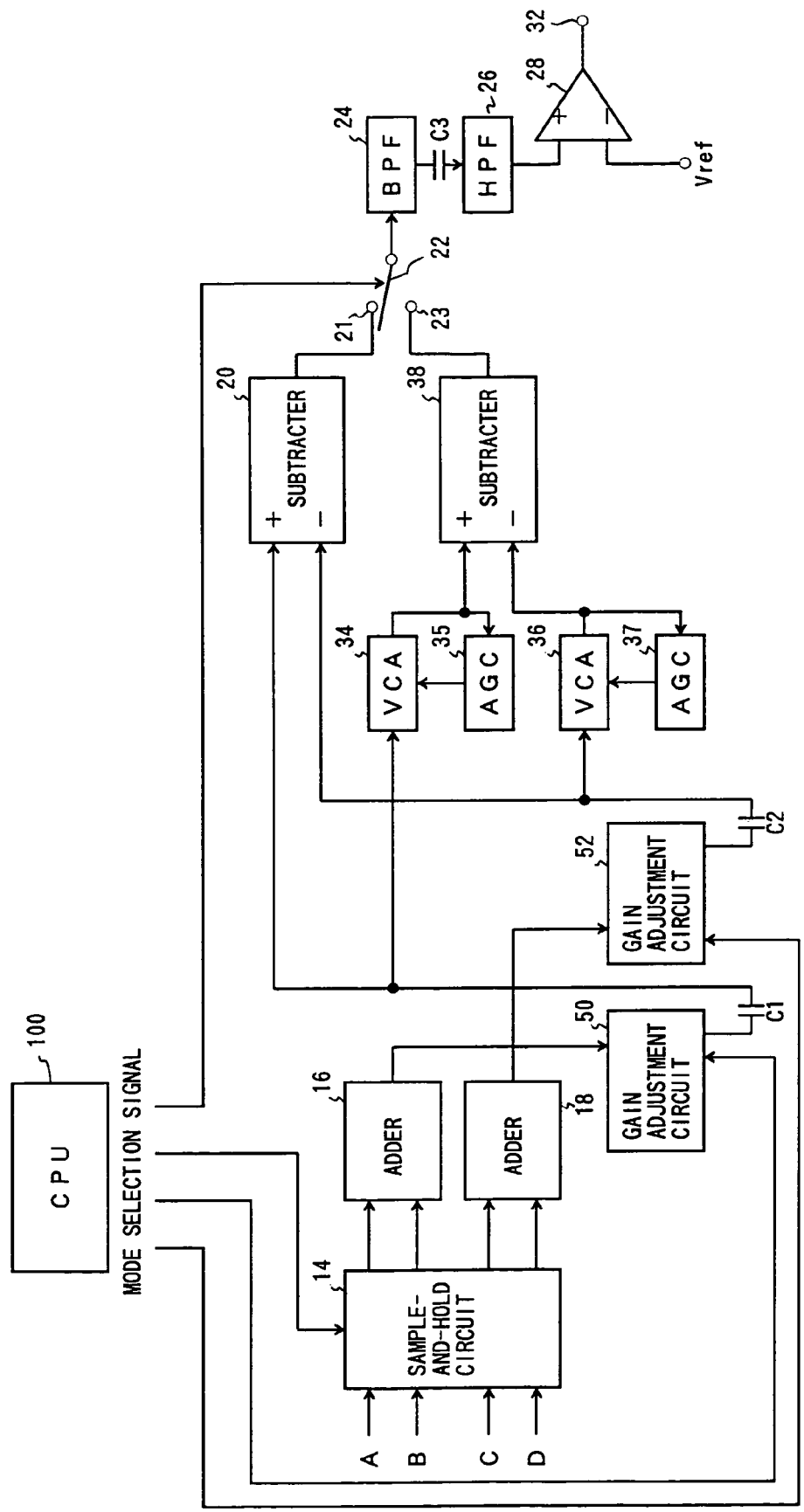
FIG. 5 is a block diagram of a wobble signal detection circuit according to a second embodiment of the present invention.

FIG. 5 is a block diagram of a wobble signal detection circuit according to a second embodiment of the present invention. In FIG. 5, the same elements as those of FIG. 4 are referred to by the same numerals. In FIG. 5, the detection signals A, B, C, and D detected by the respective detector parts 12A, 12B, 12C, and 12D of FIG. 2 are supplied to the sample-and-hold circuit 14.

The sample-and-hold circuit 14 which is also supplied with the mode selection signal from the CPU 100 is switched OFF in the above-described first and third modes to pass the supplied detection signals as the outputs, while switched ON in the above-described second mode to sample, hold and output the supplied detection signals. The detection signals A and B detected by the respective detector parts 12A and 12B are output from the sample-and-hold circuit 14 to be added by the adder 16, and the detection signals C and D detected by the respective detector parts 12C and 12D are output from the sample-and-hold circuit 14 to be added by the adder 18.

The output signals (A+B) and (C+D) of the adders 16 and 18 are supplied to gain adjustment circuits 50 and 52, respectively. The gain adjustment circuits 50 and 52 each of which is supplied with the mode selection signal from the CPU 100 are switched OFF in the first and third modes to pass the supplied signals as outputs, and are switched ON in the second mode.

For example, the gain adjustment circuits 50 and 52 are adjusted by monitoring the output of the comparator 28 using a jitter meter in the manufacturing process, so that the jitter of the output of the comparator 28 is minimized. Therefore, the output levels of the gain adjustment circuits 50 and 52, which include errors caused by the inconsistent gains and offsets of the sample-and-hold circuit 14 and the adders 16 and 18, are set at approximately the same level.

In the first mode, the output signals (A+B) and (C+D) of the adders 16 and 18, after passing through the gain adjustment circuits 50 and 52, are supplied to the subtracter 20 via the coupling capacitors C1 and C2, respectively. The subtracter 20 subtracts the output signal (C+D) from the output signal (A+B), and supplies the difference between the two output signals to the terminal 21 of the switch 22 as the output signal (A+B)−(C+D) because the terminal 21 of the switch 22 which is supplied with the mode selection signal from the CPU 100 is selected in the first mode. The output signal (A+B)−(C+D) from the subtracter 20 is supplied to the BPF 24, where unnecessary frequency components of the output signal (A+B)−(C+D) are reduced. The output signal (A+B)−(C+D) is further supplied to the HPF 26 via the coupling capacitor C3, where unnecessary frequency components of the output signal (A+B)−(C+D) are reduced. Then, the output signal (A+B)−(C+D) is compared with the reference voltage $V_{ref}$ by the comparator 28 and is output from the terminal 32 as the binary wobble signal.

On the other hand, in the third mode, the gain adjustment circuits 50 and 52 are switched OFF, and the terminal 23 of the switch 22 is selected. The output signal (A+B+RF) of the adder 16 including the reproduced RF signal is supplied to the VCA 34, while the output signal (C+D+RF) of the adder 18 including the reproduced RF signal is supplied to the VCA 36. The AGC circuit 35 performs feedback control so that the amplitude of the output signal (A+B+RF) of the VCA 34 has the predetermined level. Similarly, the AGC circuit 37 performs feedback control so that the amplitude of the output signal (C+D+RF) of the VCA 36 has the predetermined level.

The subtracter 38 subtracts the output signal (C+D+RF) from the VCA 36 from the output signal (A+B+RF) from the VCA 34. By this subtraction, the reproduced RF signals included in the respective detection signals A, B, C and D are offset, and the difference between the two output signals (A+B+RF) and (C+D+RF) is supplied to the terminal 23 of the switch 22 as the output signal (A+B)−(C+D). As the terminal 23 is selected in the third mode, the output signal (A+B)−(C+D) is supplied to the BPF 24 for the reduction of unnecessary frequency components, and is further supplied to the HPF 26 via the coupling capacitor C3 for further reduction of unnecessary frequency components. Thereafter, the output signal (A+B)−(C+D) is compared with the reference voltage $V_{ref}$ by the comparator 28 and is output from the terminal 32 as the binary wobble signal.

Further, in the second mode, the sample-and-hold circuit 14 and the gain adjustment circuits 50 and 52 are switched ON, and the terminal 21 of the switch 22 is selected. As shown in FIG. 3A, the power of the light beam alternately repeats the write power state (the maximum value) and the read power state (the minimum value). When the light beam is in the read power state, the sample-and-hold circuit 14 samples and holds the detection signals at the sampling timings corresponding to the rising edges of the sampling pulse signal as previously described with reference to FIGS. 3B and 3C.

The output signals from the sample-and-hold circuit 14 each include the sampling noise, so that the output signals (A+B) and (C+D) of the adders 16 and 18 have the waveforms shown in FIGS. 3D and 3E, respectively. However, as the noise levels of the sampling noises are adjusted to approximately the same level by the gain adjustment circuits 50 and 52, the subtracter 20 calculates the difference between the output signals (A+B) and (C+D), and outputs the signal (A+B)−(C+D) having the waveform with reduced sampling noise as shown in FIG. 3F.

As the terminal 21 is selected, the output signal (A+B)−(C+D) is supplied to the BPF 24 for the reduction of unnecessary frequency components, and is further supplied to the HPF 26 via the coupling capacitor C3 for further reduction of unnecessary frequency components. Thereafter, the output signal (A+B)−(C+D) is compared with the reference voltage $V_{ref}$ by the comparator 28 and is output from the terminal 32 as the binary wobble signal.

As described above, the sampling noise included in the wobble signal can be reduced effectively, and the capacity to reproduce the ATIP information during recording, particularly, during high-speed recording, can be improved.

According to this embodiment, the two gain adjustment circuits 50 and 52 are provided. However, the number of the gain adjustment circuits is not limited to two. The gain adjustment circuits 50 and 52 can be replaced by either one of the two, or a gain adjustment circuit similar to the gain adjustment circuits 50 and 52 can be provided for each of the four output signals from the sample-and-hold circuit 14.

Figure 6:
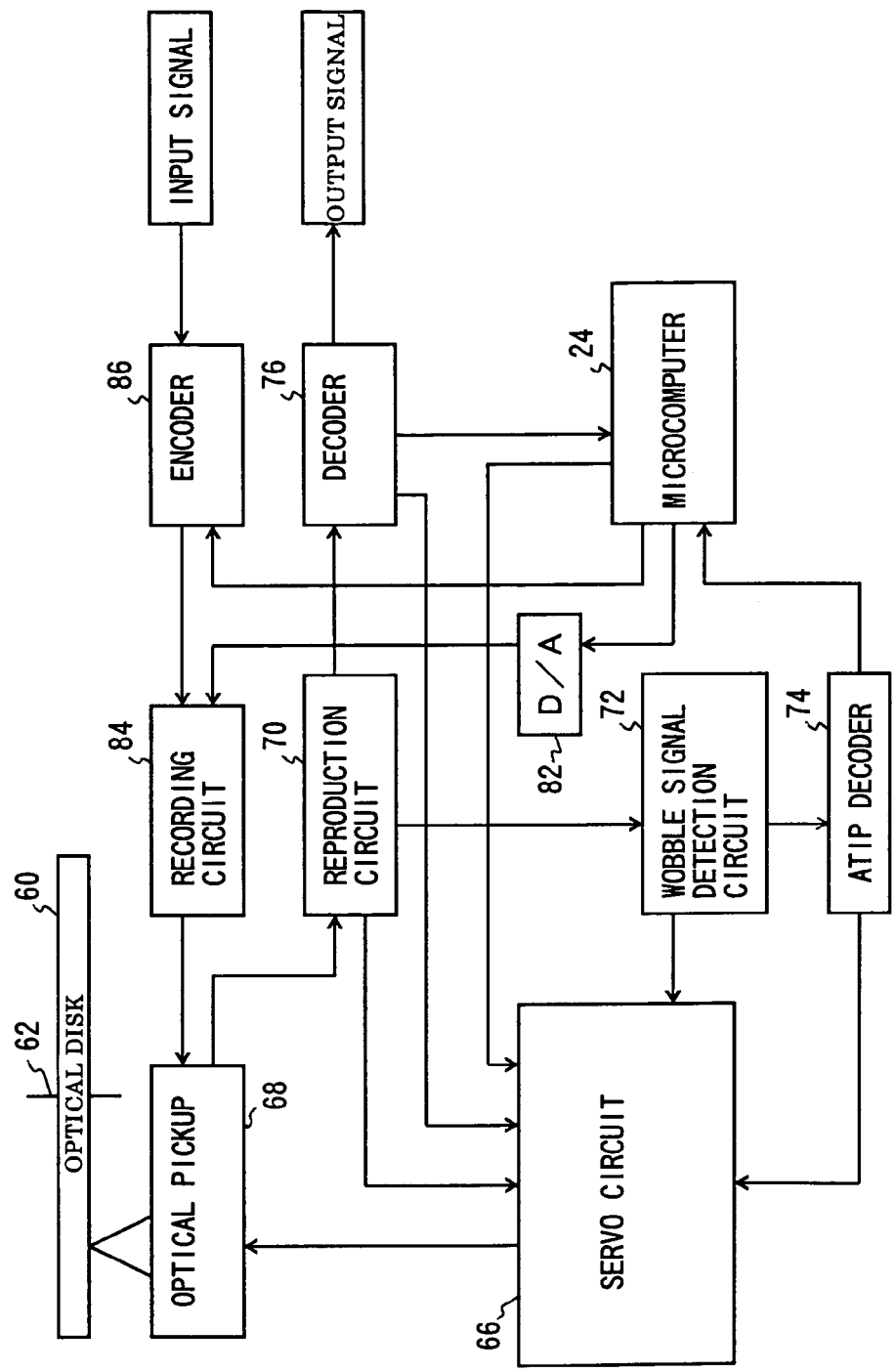
FIG. 6 is a block diagram of an optical disk apparatus according to a third embodiment of the present invention.

FIG. 6 is a block diagram of an optical disk apparatus according to a third embodiment of the present invention. According to FIG. 6, an optical disk 60 (a CD-R) is actuated by a spindle motor (not shown) to rotate about a spindle shaft 62. A microcomputer 64, which corresponds to the CPU 100 in FIGS. 4 and 5, supplies a command signal to a servo circuit 66 based on a write/read command supplied from a host apparatus (not shown). The servo circuit 66 controls the rotation of the above-mentioned spindle motor so as to maintain a constant linear velocity (CLV). The servo circuit 66 also controls the rotation of a thread motor (not shown) of an optical pickup 68 so that the optical pickup 68 is moved to a desired track of the optical disk 60. The servo circuit 66 further controls the focusing and tracking of the optical pickup 68.

A laser beam emitted from the optical pickup 68 is reflected from a recording surface of the optical disk 60 to be detected by the optical pickup 68. A read signal obtained by the optical pickup 68 is supplied to a reproduction circuit 70 for wave shaping. The read signal output from the reproduction circuit 70 is then supplied to the servo circuit 66 and, at the same time, to a wobble signal detection circuit 72, in which a wobble signal is detected. By demodulating the wobble signal using FSK in an ATIP decoder 74, ATIP information is obtained from the wobble signal, and is supplied to the microcomputer 64 and to the servo circuit 66. The read signal is demodulated in the reproduction circuit 70, and is supplied to a decoder 76 to be decoded using cross-interleave Reed-Solomon code (CIRC) and be subjected to an error correction before being output therefrom as reproduced data.

The microcomputer 64 generates a recording power control signal, which is converted into an analog signal in a D/A converter 82 to be supplied to a recording circuit 84 as a recording power control voltage. A signal to be recorded is input to an encoder 86 and encoded using CIRC based on the control of the microcomputer 64, and is supplied to the recording circuit 84.

The recording circuit 84 modulates, using eight to fourteen modulation (EFM), a signal supplied from the encoder 86 during recording. The recording circuit 84 controls the recording power in accordance with the recording power control voltage, depending on the modulated signal, and the recording power is supplied to a laser diode (LD) of the optical pickup 68 so that the LD is driven. As a result, the laser beam is projected on the optical disk 60, and the signal is recorded thereon.

The present invention is not limited to the specifically disclosed embodiments, and variations and modifications may be made without departing from the scope of the present invention.

For example, according to the above-described embodiments, the present invention is applied to the CD-R, which is a write-once optical disk. However, the recording medium is not limited to the CD-R, and an erasable disk can replace the CD-R if an ATIP signal is included therein.

The present application is based on Japanese priority patent application No. 11-266090 filed on Sep. 20, 1999, the entire contents of which are hereby incorporated by reference.

What is claimed is:

1. A wobble signal detection circuit for an optical disk apparatus which detects a wobble signal by focusing a light beam into a spot on a pregroove on an optical disk during recording of data onto and reproduction of data from the optical disk, and includes a photodetector which detects first and second lights from first and second portions of the spot, respectively, and outputs first and second detection signals corresponding to respective power levels of the first and second lights, the first and second portions being formed by splitting the spot into two portions in parallel with a scanning direction, said wobble signal detection circuit comprising:
   a sample-and-hold circuit sampling and holding the first and second detection signals output from said photodetector during the recording of the data onto the optical disk;
   lowpass filter means for reducing noise components of the respective first and second detection signals, the noise components being generated by sampling the respective first and second detection signals in said sample-and-hold circuit; and
   subtraction means for calculating a difference between the first and second detection signals respectively output from said lowpass filter means so as to obtain the wobble signal.

2. The wobble signal detection circuit as claimed in claim 1, wherein:
   said photodetector includes first, second, third, and fourth detector parts detecting corresponding light beams reflected from the spot and outputting respective detection signals corresponding to power levels of the detected light beams, the photodetector being split along the scanning direction into first and second half portions, the first half portion being split along a direction perpendicular to the scanning direction into the first and second detector parts and the second half portion being split along the direction perpendicular to the scanning direction into the third and fourth detector parts; and
   said sample-and-hold circuit samples and holds the detection signals output from the first, second, third, and fourth detector parts of said photodetector during the recording of the data onto the optical disk,
   said wobble signal detection circuit further comprising adding means to which the detection signals output from the first, second, third and fourth detector parts are supplied from said sample-and-hold circuit so that the detection signals output from the first and second detector parts are added to be supplied to said lowpass filter means, and the detection signals output from the third and fourth detector parts are added to be supplied to said lowpass filter means.

3. An optical disk apparatus for recording data onto and reproducing data from an optical disk by detecting a wobble signal by focusing a light beam into a spot on a pregroove on the optical disk, said optical disk apparatus comprising:
   a photodetector which detects first and second lights from first and second portions of the spot, respectively, and outputs first and second detection signals corresponding to respective power levels of the first and second lights, the first and second portions being formed by splitting the spot into two portions in parallel with a scanning direction; and
   a wobble signal detection circuit,
   said wobble signal detection circuit comprising:
   a sample-and-hold circuit sampling and holding the first and second detection signals output from said photodetector during the recording of the data onto the optical disk;
   lowpass filter means for reducing noise components of the respective first and second detection signals, the noise components being generated by sampling the respective first and second detection signals in said sample-and-hold circuit; and
   subtraction means for calculating the difference between the first and second detection signals respectively output from said lowpass filter means so as to obtain the wobble signal.

4. The optical disk apparatus as claimed in claim 3, wherein:
   said photodetector includes first, second, third, and fourth detector parts detecting corresponding light beams reflected from the spot and outputting respective detection signals corresponding to power levels of the detected light beams, the photodetector being split along the scanning direction into first and second half portions, the first half portion being split along a direction perpendicular to the scanning direction into the first and second detector parts and the second half portion being split along the direction perpendicular to the scanning direction into the third and fourth detector parts; and
   said sample-and-hold circuit samples and holds the detection signals output from the first, second, third, and fourth detector parts of said photodetector during the recording of the data onto the optical disk,
   said wobble signal detection circuit further comprising an adding circuit to which the detection signals output from the first, second, third and fourth detector parts are supplied from said sample-and-hold circuit so that the detection signals output from the first and second detector parts are added to be supplied to said lowpass filter means, and the detection signals output from the third and fourth detector parts are added to be supplied to said lowpass filter means.

* * * * *